Sept. 26, 1967  A. R. CRIPE  3,343,831
PNEUMATIC SPRING ASSEMBLY
Filed Dec. 28, 1965  2 Sheets-Sheet 1

INVENTOR
ALAN R. CRIPE
BY Richard N. James
ATTORNEY

United States Patent Office 3,343,831
Patented Sept. 26, 1967

3,343,831
PNEUMATIC SPRING ASSEMBLY
Alan R. Cripe, Richmond, Va., assignor to United Aircraft Corporation, East Hartford, Conn., a corporation of Delaware
Filed Dec. 28, 1965, Ser. No. 516,897
4 Claims. (Cl. 267—35)

This invention relates to pneumatic spring assemblies and has as its fundamental object the provision of a resilient backup in such assemblies, the resilient backup being operational in the event of malfunction of the pneumatic spring or its associated equipment.

The attainment of soft-riding cars is one of the primary objectives in the design of modern transportation equipment. The achievement of the desired soft ride is readily attainable through the use of air springs which provide a low natural frequency to a suspension system without excessive spring length. Further, by appropriate adjustment of the air pressure within the spring, the soft ride may be attained over a wide range of vehicle loading. Although in actual use air springs have generally exhibited excellent performance and durability characteristics, they are nevertheless more susceptible to damage and malfunction than other commonly used spring systems. On a loss of air pressure, from whatever the cause, the entire spring function is usually lost and the vehicle in which it is installed is disabled to a substantial extent.

In the present invention secondary shock absorbing means are provided in a pneumatic spring assembly to afford limited residual resilience to the assembly even in the event the entire primary spring effect is lost through failure of the pneumatic spring.

The construction and operation of this invention can best be described by reference to the following drawings in which.

Figure 1:
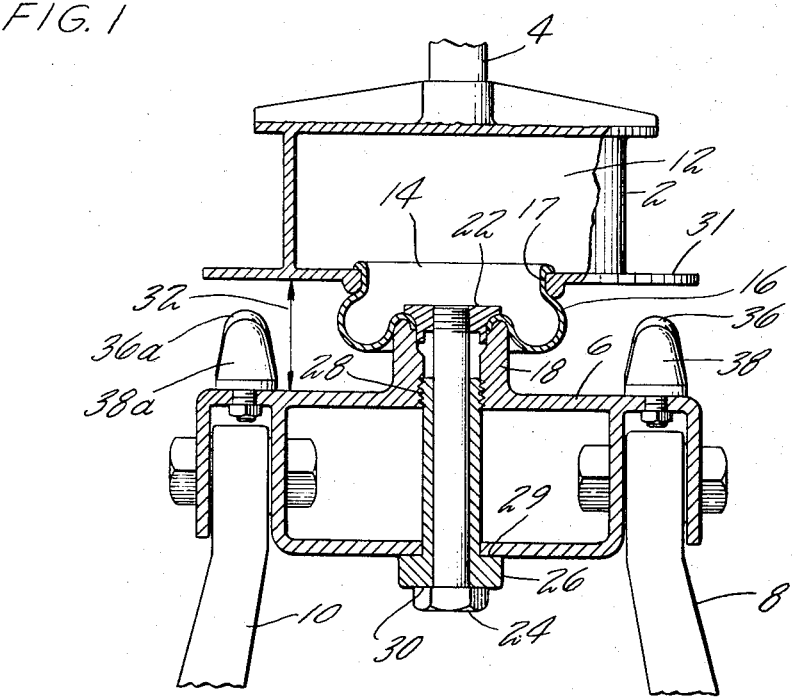
FIG. 1 is a front view of a preferred embodiment of this invention shown partially in cross section.

As is best illustrated in the embodiment of FIG. 1, the present invention comprises a vertically oriented air spring 2 mounted between two relatively movable members. One end of the air spring is connected to a car body (not shown) through member 4 and the other end is removably mounted on a supporting frame 6 which in turn carries the vehicle running gear. Relative vertical movement between the running gear and the vehicle body is permitted but restrained by a captive body of air internal of the spring. Arms 8 and 10 connected to the frame 6 provide the requisite support for the running gear structure.

For the sake of simplicity a very rudimentary form of the air spring 2 has been illustrated in the drawings. The actual details of the spring used in a given installation will vary and the specific details of the air spring per se form no part of this invention. In most installations means are provided for regulating the air pressure inside the spring. The air spring 2 of FIG. 1 generally comprises a rigid container defining therewithin an air chamber 12. An opening 14 cut in the bottom of the rigid container provides access from the chamber to the interior of a flexible diaphragm 16, the diaphragm permitting relative movement between the rigid portion of the spring and the supporting frame. One end of the diaphragm is fastened to the rigid container in an air-tight connection around the periphery 17 of the opening and the other end is fixed to the supporting frame at an upstanding flange 18 provided thereon.

In order to facilitate replacement of the air spring in the event of a malfunction, which is most likely to occur as a leak in the diaphragm, the connection between the diaphragm and the frame is made readily removable. This connection is effected by sandwiching the end of the diaphragm between cooperating surfaces on the bottom of nut 22 and the top of flange 18, the connecting force being exerted by the nut as bolt 24 is tightened against the frame. To minimize the air leakage from the chamber 12, an annular sealing insert 26 of relatively soft material is threaded into the frame to form a seal at surfaces 28 and 29. The force exerted by the bolt head when it contacts the insert similarly forms a hermetic seal at surface 30.

A rigid flange member 31 is provided as an integral part of the pneumatic spring structure, the member 31 extending normal to the axis of the spring and defining with the top of the frame 6 a closure clearance 32 which varies as the spring reciprocates with respect to the frame. A substantial clearance is provided with the spring at rest in its normal operating condition.

Figure 2:
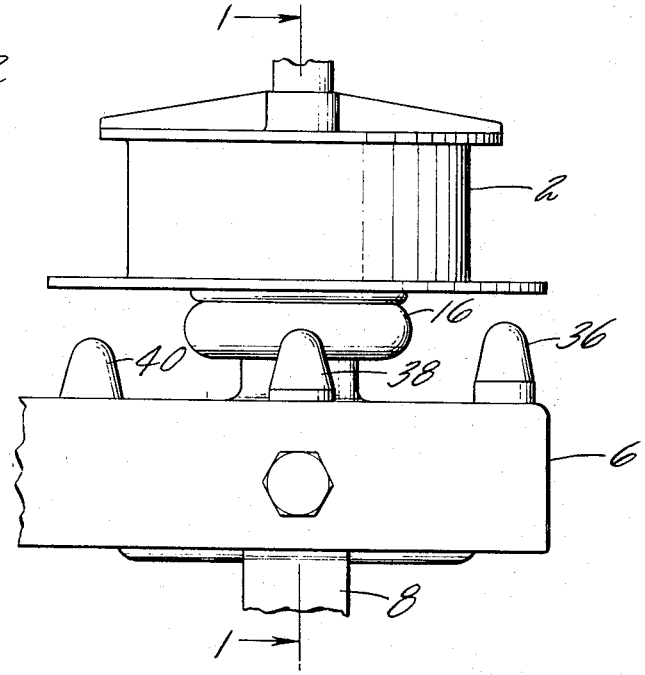
FIG. 2 is a side view of the same embodiment illustrating the pneumatic spring assembly in its normal operating position.

A plurality of erect resilient supports 36, 38, 40 and 36a, 38a and 40a are provided in the space between the rigid member 31 and the frame 6. In the embodiment shown most clearly in FIGS. 1 and 2, six such supports are provided in the assembly, the supports being arranged in parallel rows of three on opposite sides of the centerline of the spring. These supports are of progressively decreasing height in each row, the tallest support 36 being of sufficient height to just abut the underside of member 31 in the maximum downward position of this member when the spring is operating in its normal manner. The supports shown are all identical with respect to size and shape, the different heights being achieved by appropriate shimming beneath the respective supports.

Figure 3:
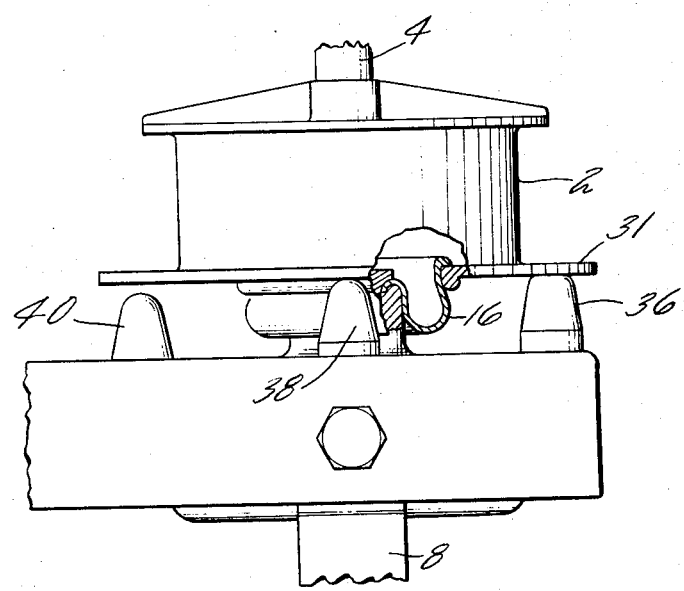
FIG. 3 is a view similar to that of FIG. 2 illustrating the spring assembly in its operating position after failure of the pneumatic spring.

Upon an air failure or other malfunction in the pneumatic spring whereby the spring effect is lost, the member 31 drops downward and engages the tallest support 36, as shown in FIG. 3. Support 36 will preferably be fabricated of butyl rubber to take advantage of its well known damping characteristics. Upon the application of a greater load, the support 36 is further deformed whereby the next tallest support 38 is brought into contact with the member 31. Similarly, the application of a still greater load will cause still further deformation of the support 36 and deformation of the support 38 whereby the shortest support 40 will be brought into contact with the spring. In this manner the rigid member 31 will be provided with different degrees of support as a function of its downward movement.

Other arrangements of the resilient supports are, of course, possible. In a given arrangement more or less support may be required, necessitating the installation of additional support members. Further, these and other design considerations may dictate a different arrangement or construction of the supports. It is further contemplated that the respective supports could be formed of different materials having varying resilience and damping characteristics.

While the present invention has been illustrated and described with reference to a specific embodiment of the invention, it will be understood that other modifications and embodiments are contemplated with the scope of the invention as set forth in the appended claims.

What is claimed is:

1. A pneumatic spring assembly for a vehicle comprising:
   a supporting frame,
   a pneumatic spring mounted on the supporting frame, the spring including a rigid member fixedly connected thereto, the rigid member being reciprocal with respect to the frame and extending transverse to the direction of reciprocation, secondary resilient structure positioned between the frame and the rigid member to limit the closure therebetween including a plurality of erect resilient supports of progressively decreasing height, the tallest of the supports having a height substantially corresponding to the minimum closure clearance between the frame and the rigid member in the normal operation of the spring, the shorter supports being sized to progressively engage as the closure clearance is diminished due to a spring malfunction whereby progressively increasing support is provided to the rigid member as an inverse function of the closure clearance, and means connecting the free end of the spring to the vehicle structure.

2. The pneumatic spring assembly of claim 1 in which the erect resilient supports are all formed to the same size and shape and the variation in the heights of their free ends is provided by shims installed between their respective bases and the structure on which they are supported.

3. The pneumatic spring assembly of claim 2 in which the resilient supports are mounted on the supporting frame in parallel rows of equal number on opposite sides of the spring axis, the respective supports in each row progressively and linearly increasing in height along the row.

4. A pneumatic spring assembly for a vehicle comprising:

a supporting frame, a vertical pneumatic spring removably mounted on the supporting frame, the spring including a rigid horizontal flange portion fixedly connected thereto, the flange portion being reciprocal with respect to the frame, a plurality of vertically directed resilient supports mounted on the frame beneath the flange portion of the spring, the free ends of the supports being positioned at different heights above the frame, the free end of the tallest supports being positioned adjacent the bottom of the flange portion at its extreme downward position in the normal operating mode of the spring, the tallest supports and shorter supports progressively engaging the flange portion as it is forced downward beyond its normal downward position subsequent to a spring malfunction whereby increasingly firm support is provided to the flange portion as a function of its downward travel, and means connecting the free end of the spring to the vehicle structure.

References Cited

UNITED STATES PATENTS 3,000,625   9/1961   Polhemus _____ 276—65

FOREIGN PATENTS 964,138   7/1964   Great Britain.

ARTHUR L. LA POINT, *Primary Examiner.*

R. M. WOHLFARTH, *Assistant Examiner.*